United States Patent
Lefevre et al.

(10) Patent No.: US 9,477,859 B2
(45) Date of Patent: Oct. 25, 2016

(54) DEVICE FOR AIDING THE LOCATION IN REAL TIME OF A SELF-POWERED MOBILE ELEMENT

(71) Applicant: EPAWN, Paris (FR)

(72) Inventors: Valentin Lefevre, Puteaux (FR); Christophe Duteil, Paris (FR); Laurent Chabin, Asnieres sur Seine (FR)

(73) Assignee: EPAWN, Paris (FR)

( * ) Notice: Subject to any disclaimer, the term of this patent is extended or adjusted under 35 U.S.C. 154(b) by 201 days.

(21) Appl. No.: 14/405,164

(22) PCT Filed: May 27, 2013

(86) PCT No.: PCT/FR2013/051163
§ 371 (c)(1),
(2) Date: Dec. 3, 2014

(87) PCT Pub. No.: WO2013/182778
PCT Pub. Date: Dec. 12, 2013

(65) Prior Publication Data
US 2015/0116091 A1     Apr. 30, 2015

(30) Foreign Application Priority Data
Jun. 7, 2012 (FR) ...................................... 12 55334

(51) Int. Cl.
| | | |
|---|---|---|
| G06K 7/10 | (2006.01) | |
| G06K 19/07 | (2006.01) | |
| H04B 5/00 | (2006.01) | |
| G06F 3/046 | (2006.01) | |

(52) U.S. Cl.
CPC ....... *G06K 7/10039* (2013.01); *G06K 19/0723* (2013.01); *H04B 5/0037* (2013.01); *H04B 5/0075* (2013.01); *G06F 3/046* (2013.01)

(58) Field of Classification Search
CPC .................... G06K 7/10039; G06K 19/0723; H04B 5/0037; H04W 4/02; H04W 40/20
See application file for complete search history.

(56) References Cited

U.S. PATENT DOCUMENTS

| | | |
|---|---|---|
| 2004/0179510 A1* | 9/2004 | Kuffner ................ G06K 7/0008 370/350 |
| 2008/0136603 A1 | 6/2008 | Choi et al. |
| 2008/0238885 A1 | 10/2008 | Zachut et al. |
| 2013/0157690 A1 | 6/2013 | Lefevre et al. |

FOREIGN PATENT DOCUMENTS

WO     2012028827 A1     3/2012

OTHER PUBLICATIONS

International Search Report, dated Jul. 3, 2013, from corresponding PCT application.

* cited by examiner

Primary Examiner — Curtis Odom
(74) Attorney, Agent, or Firm — Young & Thompson

(57) ABSTRACT

A device aimed for locating in real time self-powered mobile elements by electromagnetic radiation, includes elements (505, 520) for receiving a radioelectric signal including at least one item of synchronization information, these elements being configured to receive energy from a received radioelectric signal, elements (515) for emitting an electromagnetic signal, the electromagnetic signal being emitted in response to an activation signal, and control elements (510) connected to the receiving elements and to the elements for emitting an electromagnetic signal, the control elements being electrically powered by the elements for receiving a radioelectric signal and being configured to generate an activation signal in response to synchronization information.

19 Claims, 6 Drawing Sheets

Fig. 9
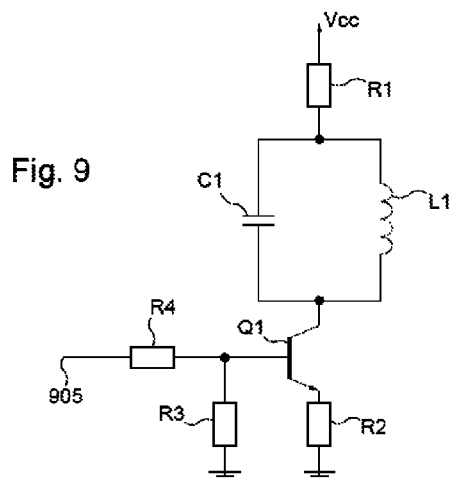
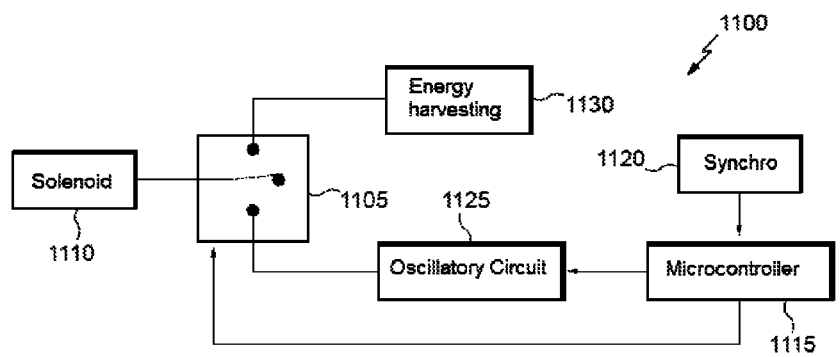
Fig. 11

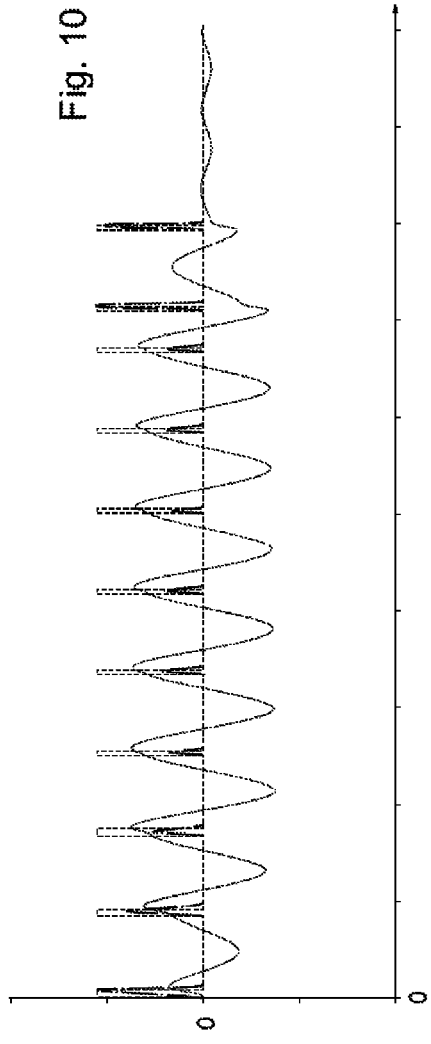
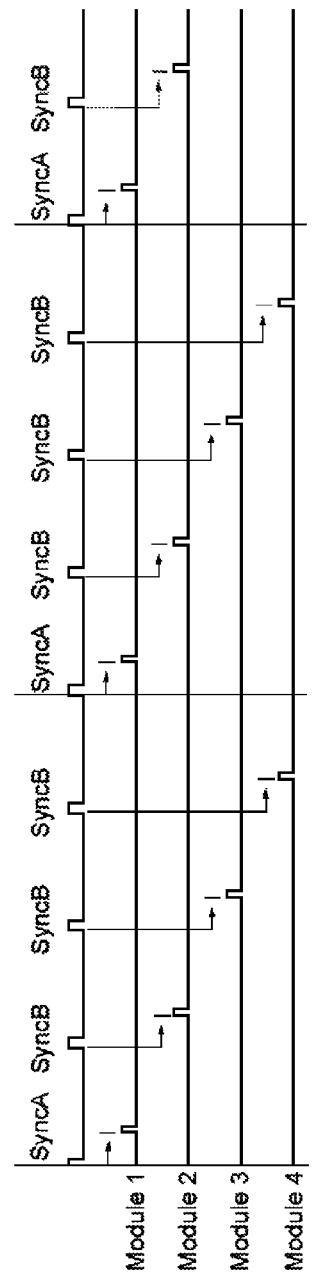

DEVICE FOR AIDING THE LOCATION IN REAL TIME OF A SELF-POWERED MOBILE ELEMENT

The present invention relates to the interfaces between a user and a computerized system, in particular in the field of games, and more particularly a device for aiding the location in real time of a self-powered mobile element.

In many situations, it can be necessary, for a computerized system, to detect the position and/or the orientation of mobile elements in order to allow the latter to react accordingly. Thus, for example, in a game of chess allowing a user to play against a virtual player simulated by the computerized system, the application run on the computerized system must know the position of all the pieces on the chess board, in particular those moved by the user, in order to calculate its move.

Solutions exist for detecting the position and/or the orientation of actual objects on a game board allowing the use of these objects as the interface of a computerized system.

Thus, for example, resistive type touch screens can be used as a game board in order to detect the position of an object such as a stylus when a sufficient pressure is applied. However, this type of screen generally supports only a single contact and requires a constant pressure by the user in order to be aware of the position. In other words, it is not possible to detect the position of the stylus if the pressure thereby exerted is released.

It is also possible to use touch screens of the capacitive type, based on the principle of a leakage of current via a conductive body. However, only objects that are conductive and grounded allow the detection of their position. Thus, for example, the positions of plastic or wooden objects cannot be determined using such screens.

Moreover, generally, solutions based on a touch screen, or touch film, can only support a limited number of simultaneous or quasi-simultaneous contacts and do not allow a large number of objects to be determined.

Other solutions utilize infra-red based technologies, in particular in the form of tables. Thus, for example, the products known as Surface (Surface is a trade mark of Microsoft), mTouch (mTouch is a trade mark of Merel Technologies) and Entertaible (Entertaible is a trade mark of Philips) utilize infra-red cameras arranged within the thickness of the table. However, the required thickness of these tables makes them bulky, not very mobile, and gives them a degree of rigidity. Moreover, their price does not really permit family use.

Finally, another solution developed by the applicant allows the interfacing in real time of a plurality of mobile elements with a computerized system. After having selected at least one location module incorporated within a mobile element, this location module is activated sequentially. A signal is then received from this activated location module and an item of position data of the mobile element comprising this activated location module is calculated in real time from the signal received. The location modules are activated sequentially, a single location module being activated at a given moment.

While the latter solution is satisfactory, there is a constant need for improvement of the performance and reduction of the manufacturing costs.

The invention makes it possible to resolve at least one of the aforementioned problems.

A subject of the invention is thus a device for aiding the location in real time, by electromagnetic radiation, of a self-powered mobile element, this device comprising the following means, means for receiving a radio signal comprising at least one synchronization data item, said means being configured to receive power from a radio signal received;

means for transmitting an electromagnetic signal, said electromagnetic signal being transmitted in response to an activation signal;

control means connected to said means for receiving and to said means for transmitting an electromagnetic signal, said control means being electrically powered by said means for receiving a radio signal and being configured to generate an activation signal in response to a synchronization data item.

The device according to the invention thus makes it possible to combine advantages linked to the use of standard technologies that are able in particular to be utilized at moderate cost, with those of an architecture allowing the use of the mobile elements in applications known as real-time, in which several hundreds of mobile elements can be used.

Said means for receiving a radio signal comprise, preferably, a dual-port memory, said dual-port memory being configured to be read- and/or write-accessible by a radio signal and by said control means. The device according to the invention thus makes it possible to use a feature of many standard circuits to control the activation of a mobile element in order to allow it to be located and/or to control other associated functions, in particular of actuators, motors and/or displays.

According to a particular embodiment, said means for receiving a radio signal comprise means for the identification of a synchronization data item from a radio signal received and means for the transmission of an identified synchronization data item to said control means. The device according to the invention thus makes it possible to use a feature of many standard circuits to control the activation of a mobile element in order to allow it to be located.

Still according to a particular embodiment, said control means comprise means for detecting a change of state of an electrical power source of said means for receiving a radio signal, a synchronization data item being identified in response to a change of state of an electrical power source of said means for receiving a radio signal. The device according to the invention is thus particularly simple to utilize.

Still according to a particular embodiment, said control means comprise means for detecting a change of state of a carrier of a radio signal received, a synchronization data item being identified in response to a change of state of a carrier of a radio signal received. The device according to the invention is thus particularly simple to utilize.

Still according to a particular embodiment, said control means comprise means for accessing a value stored in said dual-port memory, a synchronization data item being identified as a function of a value stored in said dual-port memory. It is thus easy to set the parameters for the device according to the invention and limit the latency times that may be induced.

Said means for transmitting an electromagnetic signal comprise, preferably, a solenoid and a switch controlling the activation of said solenoid.

According to a particular embodiment, the device comprises moreover means for determining a moment of generation of an activation signal, said moment being determined according to the moment of reception of a synchronization data item and an item of delay information. The device thus allows many mobile elements to be used sequentially while limiting the latency time that may arise between the successive activation of two mobile elements.

Said means for receiving a radio signal comply, for example, with an RFID-type standard or recommendations such as the QI recommendations.

According to a particular embodiment, said control means also comprise means for controlling at least one actuator of said mobile element.

Still according to a particular embodiment, the device also comprises second means for transmitting an electromagnetic signal, said means for transmitting an electromagnetic signal being called first means for transmitting an electromagnetic signal, said first and second means for transmitting an electromagnetic signal being configured to transmit an electromagnetic signal one after another in order to allow the orientation of said mobile element to be determined.

Further advantages, aims and features of the present invention will become apparent from the detailed description below, given as a non-limitative example, in relation to the attached drawings, in which:

FIG. 1 diagrammatically shows an example of an architecture capable of use for implementing the invention;

FIG. 9 shows an example of an oscillatory circuit for a mobile element, controlled by a microcontroller;

FIG. 10 shows a simulation demonstrating the active control of the phases of starting and stopping oscillation of an inductor;

FIG. 11 shows an example of a location module making it possible to receive power from rows and columns of a location surface, used to receive location signals originating from location modules; and FIG. 12 shows an example of a synchronization timing chart when two synchronization signals are used.

Figure 1:
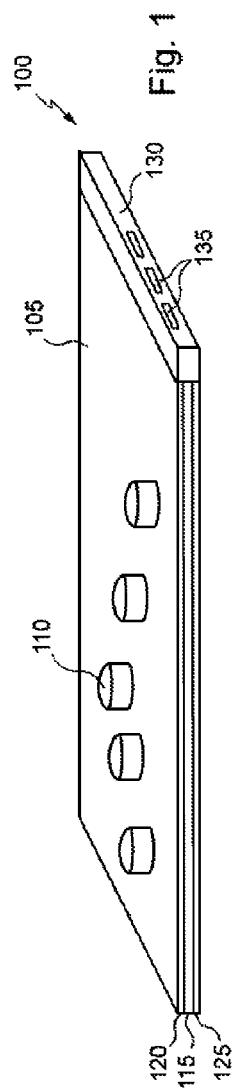

Generally a subject of the invention is a mobile element the position (x-axis, y-axis and/or altitude) and/or orientation (yaw, pitch and/or roll) of which can be determined by a surface capable of determining sequentially the position and/or the orientation of a set of mobile elements. To these ends, each mobile element is here provided with at least one location module and one activation module. The position can be a two-dimensional position in one plane, or a three-dimensional position comprising an altitude (or elevation). The detection surface can be combined with a screen in order to provide, for example, decor elements or information.

By way of illustration, capturing the three-dimensional positions of mobile elements can be carried out via electromagnetic field. To these ends, a surface for the detection of the positions of the mobile elements, composed of an electromagnetic capture grid of the row/column type, is used. It is associated with an electronic module capable of calculating, by demultiplexing, the position of a location module emitting an electromagnetic field.

Each location module is therefore selected sequentially, for example according to an identifier which is specific thereto, so that it emits an electromagnetic field. To these ends, each location module comprises an activation mechanism so that, when it is activated, it emits an electromagnetic field that can be captured by the detection surface.

A position detection driver module is associated with the detection surface in order to sequentially activate the electromagnetic emissions of the location modules via a command signal or to control such a sequential activation. The command signal between this module and the location modules is advantageously transmitted via wireless connections.

The command signal can address each location module selectively, for example according to their identifiers, or a set of location modules which are then activated sequentially according to delay mechanisms incorporated therein, allowing activation after a predetermined delay following the reception of a command signal.

According to the invention, the electronics activating and locating the mobile elements is electrically powered by induction, the antenna used for capturing the power also being used for activating and synchronizing the mobile element, i.e. allowing communication between the location surface and a mobile element. The supply by induction, utilizing inductive coupling, can use specific control circuits or standard circuits, for example circuits according to the RFID standards (for Radio Frequency Identification) or the QI recommendations (developed by the Wireless Power Consortium) such as the circuits bearing the references BQ500110 and BQ5101x developed by the company Texas Instruments.

The surface for the detection of the positions is, for example, a flexible or rigid PCB-type board (for Printed Circuit Board) for electromagnetic reception. It may be associated with a screen, also flexible or rigid, touch or non-touch, for example a screen of the LCD (for Liquid Crystal Display) or OLED type (for Organic Light-Emitting Diode) making it possible to manoeuvre the mobile elements on an interactive visual surface. The detection surface can also be associated with a magnetic surface allowing the mobile elements to be maneuvered on an inclined, vertical or inverted (top down) plane or subjected to impacts, without affecting the position detection.

FIG. 1 diagrammatically shows an example of an architecture 100 capable of use for implementing the invention;

The architecture 100 here comprises a board 105, for example a game board, on which are arranged mobile elements 110 allowing a user to interact with a computerized system associated with this board by moving the mobile elements 110. Although only five mobile elements are represented here, it is possible to use several tens, or even several hundreds, of them. The board 105 defines the area for the detection of the position and/or the orientation of the mobile elements utilized.

The board 105 here comprises a detection surface 115 coupled to a screen 120 and a magnetized surface 125 (the detection surface 115, the screen 120 and the magnetized surface 125 are here substantially parallel). It also comprises a hardware module 130 (or central processing system) for detecting the position and, if necessary, the orientation of the mobile elements 110 as well as for running one or more applications with which the user interacts. The hardware module 130 is in particular in charge of managing detection of the positions and/or orientations of the mobile elements, i.e. identifying the location modules one after another, activating them so that each in turn they emit an electromagnetic field and assessing their positions.

The hardware module 130 is preferably inserted into a casing with the other elements of the board 105. Alternatively it can be a remote module incorporated for example in a computer or games console. It can be electrically powered by a rechargeable battery or via a mains power adapter and has a set of conventional connectors 135, for example an electrical plug for a mains power adapter, USB, Ethernet, VGA video (for Video Graphics Array) and/or HDMI (for High Definition Multimedia In) ports as appropriate, in particular if a screen is associated with the detection area. It comprises moreover, preferably, a wireless communication module, for example a wireless communication module of the WIFI or Bluetooth type allowing interaction with another computerized system and/or access to data via a communication network.

The hardware module 130 typically comprises a calculation module and a module driving position detection and capture detailed hereinafter. The calculation module is here provided with a central processing unit (CPU), a graphics processing unit (GPU), memory components (random access memory RAM, read-only memory ROM and/or Flash-type memory) for storing the programs and variables necessary for the implementation of the invention, as well as a sound processing module, in the form, for example, of a chipset.

According to a particular embodiment, the hardware module 130 is not integrated with the board 105 but is linked thereto. For example a device of the smartphone type is concerned, connected to the board 105.

The position detection and capture drive module sequentially activates, preferably by radio, each location module the position of which must be determined or controls such a sequential activation. After activation, each location module here emits an electromagnetic field captured by the detection surface. This latter then transmits to the position detection and capture module items of information allowing the position of a location module to be calculated, for example of the (x, y, z) type. As described hereinafter, when several location modules are associated with the same mobile element, it is possible, from the positions of these location modules, to determine orientation parameters of this mobile element, for example in the form of angles. The positions and/or orientation of all the mobile elements the position and/or the orientation of which must be determined are then transmitted to the calculation module which uses them to manage the interactivity with the application in question.

In the remainder of the description, the board 105 and the associated electronics are called the effective area.

Figure 2:
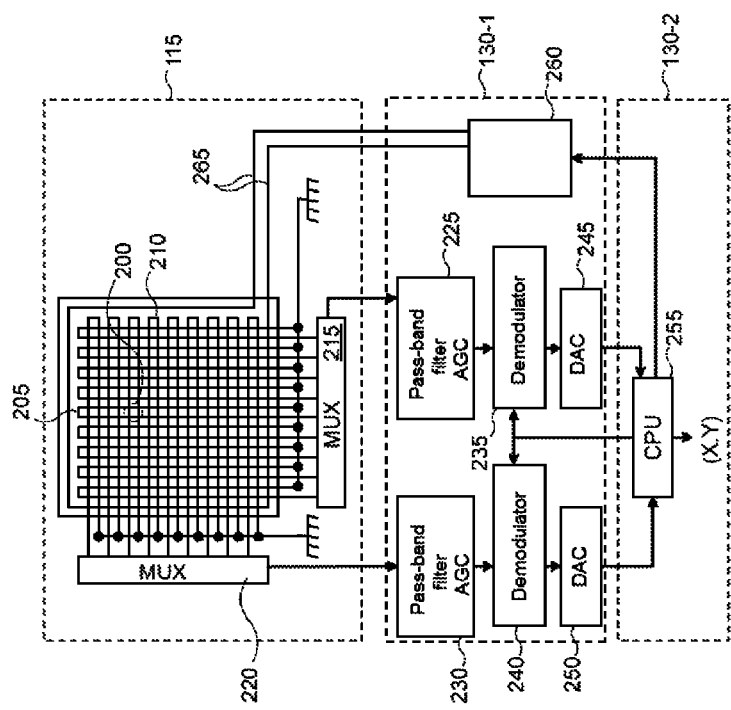
FIG. 2 shows an example of an associated detection and logic surface for determining the position and the orientation of a mobile element.

FIG. 2 shows an example of a detection surface and associated logic.

The detection surface 115 is here constituted by a grid in the form of rows and columns constituting a conductive grid. The latter comprises a set of conductive loops along two orthogonal axes. Each loop is a separate sensor making it possible to measure the intensity of the current or the voltage induced by a radiating element, typically a solenoid belonging to a mobile element the position and/or the orientation of which must be calculated, which is positioned on the detection surface.

By way of illustration, it is assumed here that a solenoid is placed at position 200, i.e. at the intersection of the loops 205 and 210 one end of which is grounded and the other end is linked to the electronic components used for calculating a position. When the solenoid situated at position 200 is powered, it generates an inductive current in the loops 205 and 210 which can be analyzed and compared with the current induced in the other loops. It is thus possible, by inductive coupling between the solenoid and the grid and by measuring the induced current, to determine the position of the solenoid.

Multiplexers 215 and 220 are linked to each loop of each of the two axes of the grid, i.e. here to each of the vertical and horizontal loops, respectively. The outputs of the multiplexers 215 and 220 are connected to the automatic gain controllers (AGC) 225 and 230, respectively, of the position detection and capture drive module, referenced here 130-1, of the hardware module 130. The output signals of the automatic gain controllers 225 and 230 are firstly demodulated in the demodulators 235 and 240, respectively. The demodulation produces a continuous signal (DC, acronym for Direct Current) proportional to the original sinusoid plus alternating components (AC, acronym for Alternating Current), multiples of the fixed frequency emitted by the solenoid.

According to a scheme that is in common use, the calculation module, here referenced 130-2, of the hardware module 130 drives the multiplexers 215 and 220 in order to sequentially activate the loops, i.e. to activate a loop n+1 after a loop n. When the last loop is reached, the processor initiates a new cycle and drives the activation of the first loop.

A pass-band filter is advantageously utilized in each automatic gain controller 225 and 230 in order to suppress the unwanted harmonics of the demodulated signal as well as the electromagnetic background noise This filtering makes it possible to refine the measurements of the signals originating from the multiplexers 215 and 220, which are demodulated in the demodulators 235 and 240 then digitized in the analog/digital converters (ADC) 245 and 250, respectively.

The digital values obtained are transmitted to the central processing unit (CPU) 255 of the calculation module 130-2 for storage. As shown, the central processing unit 255 controls the demodulators 235 and 240.

After the values have been stored, the central processing unit increments the address of the multiplexers in order to proceed with the digitization of the signals originating from the next loops. When a last loop is reached, the central processing unit reinitializes the address of the multiplexer corresponding to the value of the first loop of the axis in question.

At the end of a cycle, the central processing unit has stored, for each axis, as many digital values as there are adjacent loops close to the position of the solenoid. Based on these values, the central processing unit calculates the position of the solenoid by interpolation, as described hereinafter.

It is observed here that grounding the loops can be carried out by strips of metal positioned between the different loops in order to protect them from electromagnetic interference. An alternative consists of arranging a uniform ground plane under the conductive grid.

Moreover, the position detection and capture control module 130-1 comprises here a transmitter 260, controlled by the central processing unit 255 of the calculation module 130-2, allowing a location module of a mobile element to be activated. By way of illustration, the central processing unit 255 transmits an identifier to the transmitter 260 of a location module to be activated. This identifier is coded then transmitted in the form of a digital or analog radio signal. Each location module receiving this signal can then compare the identifier received with its own identifier and activate itself if the identifiers are identical. Alternatively, the central processing unit 255 transmits to the transmitter 260 a general activation command which is coded then transmitted in the form of a digital or analog radio signal.

The transmitter 260 is linked to an antenna 265 allowing the transmission of a command signal used by the mobile elements as a power source and to activate the location modules. The antenna 265 is advantageously placed on the detection surface 115, for example around the loops 205 and 210. According to a particular embodiment, the loops 205 and 210 can also be used to form the antenna 265. To these ends, a switch is used to determine the transmission or reception function of the loops 205 and 210 (these latter are then, as a function of the position of the switch, linked to the multiplexers 215 and 220 or to the transmitter 260).

As described below, the transmitter 260 can in particular comprise an RFID type reader.

Thus, in order to estimate the position of a set of location modules, it is necessary to sequentially activate each location module and, for each of these activations, according to the embodiment described here, carry out a cycle on each set of loops.

Several detection surfaces can be combined together, the surface area of the resulting detection surface being the sum of the surface areas of the combined detection surfaces. To these ends, one detection surface is regarded as master, the others being regarded as slaves. The sequential activation of the mobile elements is managed by the master detection surface which receives, preferably, the positions calculated by the hardware modules associated with each slave detection surface and consolidates them by preparing a table containing the coordinates and degrees of freedom of the location modules.

Figure 3:
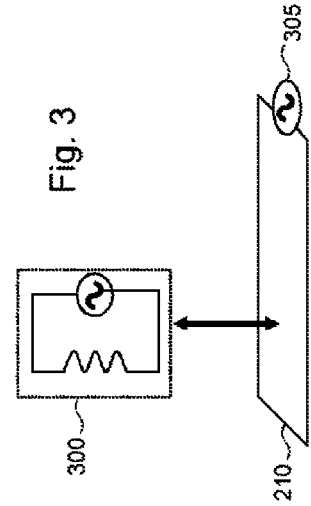
FIG. 3 shows diagrammatically the physical principle of inductive coupling between a solenoid and a conductive loop of a detection surface.

FIG. 3 shows diagrammatically the physical principle of inductive coupling between a solenoid and a conductive loop of a detection surface;

According to the invention, each mobile element the position and/or the orientation of which must be calculated comprises at least one solenoid the axis of which is, preferably, oriented towards the detection surface.

An alternating current passes through the solenoid 300 and emits an electromagnetic field which propagates towards the detection surface, in particular, in this example, towards the loop 210. The loop 210, receiving an electromagnetic field originating from the solenoid 300, couples with the solenoid 300. It is then possible to measure an alternating signal at the terminals of this loop, referenced 305.

The coupling between the solenoid 300 and the loop 210 can be expressed in the form of the following relationship, $$R = \frac{k}{D^2} E$$

where

E denotes the voltage at the terminals of the solenoid 300, R denotes the voltage of the signal received at the terminals 305 of the reception loop 210, D is the distance between the solenoid 300 and the reception loop 210 and k is a constant linked to of the intrinsic factors of the system comprising the solenoid and the reception loop, in particular the number of turns of the solenoid and the size of the loop.

Figure 4:
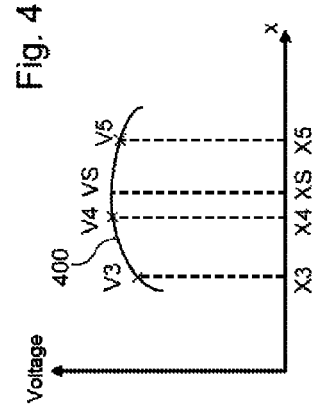
FIG. 4 shows diagrammatically an interpolation mechanism making it possible to calculate the position of a solenoid placed on a detection surface, along a given axis, from measurements obtained by a system such as that described with reference to FIG. 2.

FIG. 4 shows diagrammatically an interpolation mechanism making it possible to calculate the position of a solenoid placed on a detection surface, along a given axis, from measurements obtained by a system such as that described with reference to FIG. 2.

It is assumed here that the solenoid is situated close to vertical loops B3, B4 and B5, positioned along x-axes X3, X4 and X5, the voltages measured at the terminals of these loops being marked V3, V4 and V5, respectively. The solenoid is here at a position marked XS on the x-axis.

The coordinates X3, X4 and X5 can be obtained by the central processing unit from an identifier of the corresponding loop (these values are predefined according to the routing table of the detection surface and, preferably, stored in a non-volatile memory).

The portion of curve 400 represented in FIG. 4 shows the voltage variation for the position XS of the solenoid according to the positions of the loops coupled with the solenoid, extrapolated from the values measured by the loops B3, B4 and B5. It can be compared to a second degree function of the parabolic type. This local approximation corresponds, in practice, to the phenomenon of electromagnetic coupling between a solenoid and loops of a conductive grid.

The following relationships illustrate this property.

$$V3 = a(X3-XS)^2 + b$$

$$V4 = a(X4-XS)^2 + b$$

$$V5 = a(X5-XS)^2 + b$$

where a and b are constants, a being a constant less than zero (a<0).

Moreover, taking account of the hypothesis of a second degree function, the relationships between the x-axes X3, X4 and X5 can be expressed in the following form, $$X4-X3 = X5-X4 = \Delta X$$

$$X5-X3 = 2\Delta X$$

($\Delta X$ representing the distance between the x-axes X3 and X4 and between the x-axes X4 and X5).

Thus, it is possible to interpolate the position of the solenoid according to the following formula:

$$XS = X3 + \frac{\Delta X}{2} \frac{3V3 - 4V4 + V5}{V3 - 2V4 + V5}$$

It is also possible, according to the same logic, to determine the position of the solenoid along the y-axis.

Moreover, the distance between the solenoid and the loop (i.e. the altitude of the solenoid with respect to the detection surface) can be defined according to the following relationship, $$D = \sqrt{\frac{k}{R} E}$$

The distance D is therefore a function of the value R representing the voltage at the terminals of the relevant loops of the detection surface. It can be extrapolated from the measurements carried out. It is noted that the accuracy of this distance calculation is in particular linked to the stability of the signal E emitted by the solenoid, the value of which must be as constant as possible over time, which requires a stabilized power supply in the location module which must not drop during discharge of the battery. This can be provided by a voltage regulator of the location module.

As previously indicated, the electronics for activation and location of the mobile elements are electrically powered by induction, the antenna used for capturing the power also being used to activate and synchronize the mobile element. According to a particular embodiment, the power supply of the location modules of the mobile elements is provided by a remote supply module of an RFID type circuit. The use of an RFID type technology can thus be used to supply power to the location modules and, if necessary, as a means of communication in order to make it possible to activate or synchronize them.

To these ends, the transmitter 260 shown in FIG. 2 (or more generally the position detection control module) uses a reader of the RFID reader type allowing a communication and synchronization mode of the location module via RFID technology. The communications can then be carried out by writing to and reading from a non-volatile memory of a circuit of the RFID type fitted into the mobile elements. Such memories are advantageously accessible via the effective area by RFID type ports as well as via microcontrollers fitted into the mobile elements via direct electrical links. A synchronization can in particular be carried out via a specific modulation of the amplitude of the RFID carrier.

Thus, according to a particular embodiment, the electronics of the effective area comprise a reader of the RFID type, i.e. a system allowing read and write access to components of the RFID type, or RFID tags, situated close to the effective area. These electronics comprise here at least one conductive coil covering all or part of the effective area, used as an RFID transmitter/receiver antenna.

The average magnetic power emitted by the RFID antenna of the effective area is of such a level as to allow remote electronic power supply by magnetic induction of the electronics of the mobile elements situated in immediate proximity to the RFID antenna.

It is observed here that the RFID reader and the mobile elements can use one of the many RFID standards and those derived therefrom such as the standards ISO/IEC 15693, ISO 18000-3, ISO 18000-4, ISO 18000-7, ISO/IEC 14443, ISO/IEC 18092 (better known as NFC, for Near Field Communication), ISO/IEC 21481 (also known as NFC).

The central processing unit used for controlling the effective area, for example the central processing unit 255, is also used here for controlling the RFID reader. It can also control the timing of the activation and deactivation of the production of the remote power supply electromagnetic field in phase with a cycle of duration $T_1$ of a common synchronization signal.

According to a particular embodiment, at least some of the mobile elements contain a non-volatile dual-port memory. The latter is here accessible both by a reader of the RFID type, via a wireless communication, and by a local microcontroller, via a wired link, for example a link complying with the I2C bus (Inter Integrated Circuit) standard. While this dual-port memory can be used for triggering the activation of a mobile element and therefore allowing it to be located, it can also be used for other purposes by offering a particular means of communication between a mobile element and the effective area.

Advantageously, the dual-port memory of a mobile element is read- and write-accessible RFID-type reader of the effective area. It forms a means of communication between the logic of the effective area and a microcontroller fitted into a mobile element. The microcontroller is, preferably, alerted to each read and write request received via the wireless communication protocol. After receiving an indication of the reception of a request, the microcontroller can query this memory in order to determine if such a request is intended for it, the type of access (read or write access) and the memory address to which the access request relates.

Moreover, each mobile element contains in non-volatile memory a unique identifier stored, for example, on 64 bits. According to a particular embodiment, this unique identifier is the one known as UID (for Unique IDentifier) of an electronic component accessible using a reader of the RFID type. Such an identifier can in particular comply with a standard such as the standards ISO 15693, ISO 18000-3 and ISO14443. Thus, a reader of the RFID type allows the computerized system linked to the detection surface to detect the arrival of new mobile elements and to identify them uniquely by their identifier.

As described hereinafter, the logic associated with the detection surface can determine and allocate a time-out value to each location module detected. A time-out value represents here a period of time after which a location module must transmit a location signal following the detection of a synchronization signal. The time-out value allocated to a newly detected location module can be a free time-out value (previously allocated to a location module which no longer detected).

To these ends, the RFID-type reader can address the determined time-out value to a dual-port memory of a location module in a write request. By way of illustration, a computerized system associated with the detection surface can query a local or remote database with the identifier of the location module as access key. Such a database advantageously makes it possible to obtain the list of the functional features of the mobile element. Thus, for example, this database can be used to determine if the mobile element comprising the location module in question has motors, actuators, display devices, sound production devices, sensors and/or switches. The list of the functionalities obtained can in particular be used for determining the nature of exchanges of commands and data that are possible between the computerized system and the mobile element.

The dual-port memory and the non-volatile memory used for storing an identifier of a location module are, preferably, integrated with a remote power supply module within one and the same component. Such components are available. Thus, for example, the company ST Micro Electronics manufactures a component under reference M24LR16E which offers dual-port memory, energy harvesting and wireless interfacing.

In a mobile element, such a circuit is advantageously linked to a microcontroller by a bus of the I2C type.

Moreover, each mobile element comprises one or more oscillatory circuits as well as at least one switch in order to allow the emission of location signals. The switch is advantageously controlled by the microcontroller which thus triggers the oscillation or stopping of the oscillation allowing the corresponding location module to be located. It is observed here that the use of two oscillatory circuits makes it possible to locate a mobile element and to determine its orientation. A single oscillatory circuit can be used if only the position of the mobile element must be determined. Alternatively, more than two oscillatory circuits can be used, in particular for improving the estimation of the position and/or the orientation of the mobile element.

Figure 5:
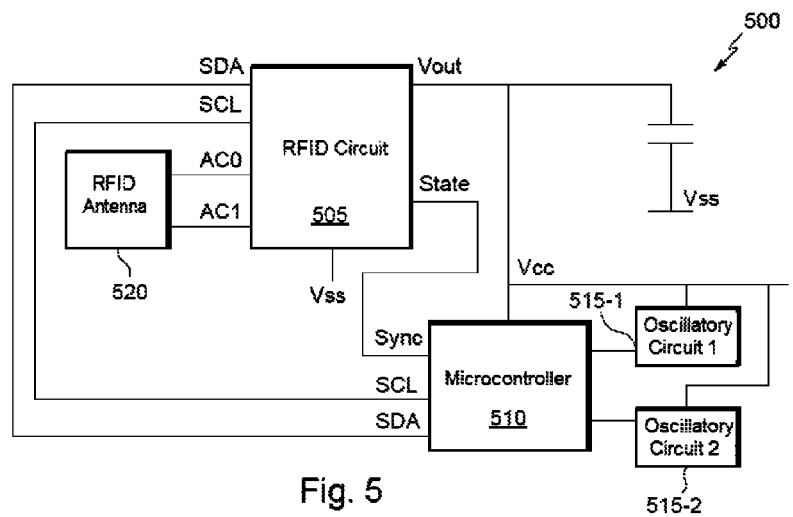
FIGS. 5 to 8 show embodiments of mobile element electronic circuits, allowing them to be located.

FIG. 5 shows a first embodiment of an electronic circuit 500 of a mobile element. As shown, the circuit 500 comprises a standard component 505 offering functions of the RFID type and incorporating a dual-port memory, called an RFID component, or chip, a microcontroller 510 and two oscillatory circuits 515-1 and 515-2, generically referenced 515. The circuit 500 also comprises an antenna 520 of the RFID type adapted to the characteristics of the circuit 505. The antenna 520 is typically a coil linked to the circuit 505 via two links called AC0 and AC1 (for antenna coils).

According to this embodiment, two oscillatory circuits are utilized, sequentially, to make it possible to determine the position and the orientation of the mobile element. In other words, the mobile element comprises here two location modules, these location modules having a common part (comprising essentially the RFID circuit, the RFID antenna and the microcontroller) and separate parts (comprising essentially the oscillatory circuits).

The RFID circuit 505 is here connected to the microcontroller 510 by a bus of I2C type comprising a serial link for a clock signal called SCL (for Serial CLock) and a serial link for transmitting data called SDA (for Serial Data). The power supply terminal of the microcontroller 510, denoted here Vcc, like that of the oscillatory circuits 515-1 and 515-2, is connected to the terminal of the RFID circuit 505 delivering a voltage, denoted here Vout. Conventionally, the terminal of the RFID circuit 505 delivering a voltage is linked to a reference terminal denoted Vss by a capacitor making it possible to absorb electrical spikes.

Moreover, the synchronization signal of the microcontroller, used for controlling the triggering or stopping of the oscillation (allowing the mobile element to be located), is connected to a state terminal of the RFID circuit, denoted here state.

As the RFID circuit 505 is linked to the RFID antenna 520, it can receive electrical power from an RFID reader and exchange data with the reader, according to read and write requests, in particular for updating its memory. As the output Vout of the RFID circuit 505 is linked to the power supply terminals Vcc of the microcontroller 510 and of the oscillatory circuits 515-1 and 515-2, these circuits can be electrically powered and used.

According to a particular example, the state terminal state of the RFID circuit 505 indicates, by a first logic state, for example the value 1, that the RFID circuit is receiving and processing a read or write request or, more generally, that it is carrying out a predetermined task. Otherwise, the state terminal state of the RFID circuit 505 is in a second logic state, for example the value 0. Thus, owing to the connection of the synchronization terminal of the microcontroller 510 to the state terminal state of the RFID circuit 505, one of the oscillatory circuits 515-1 or 515-2 can be activated by the microcontroller 510, immediately or deferred, depending on a state of the RFID circuit 505. In other words, an oscillation and therefore an electromagnetic emission is triggered (after predetermined delay that can be zero) when the state terminal state of the RFID circuit 505 is in the first logic state and stopped (also after a predetermined delay that can be zero) when the state terminal state of the RFID circuit 505 is in the second logic state. In other words, the RFID circuit 505 is in charge of controlling the triggering or stopping of the oscillation (allowing the mobile element to be located).

It is noted here that the activation of the oscillatory circuits can, for example, be carried out sequentially according to a predetermined staggered delay (one of the oscillatory circuits can be activated after a first predetermined delay following the synchronization signal and the other oscillatory circuit can be activated after a second predetermined delay following the synchronization signal).

Figure 6:
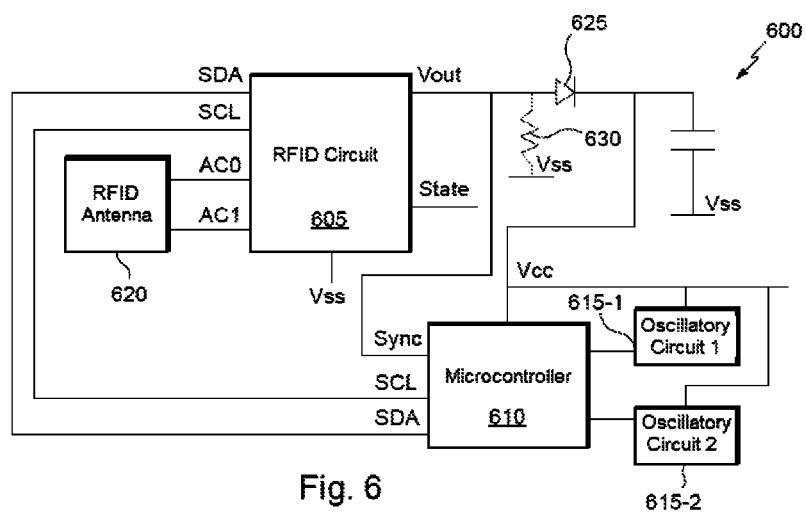

FIG. 6 shows a second embodiment of an electronic circuit 600 of a mobile element. Like the circuit 500, the circuit 600 comprises a standard component 605 offering functions of the RFID type and incorporating a dual-port memory (RFID component), a microcontroller 610 and two oscillatory circuits 615-1 and 615-2, generically referenced 615. The circuit 600 comprises moreover an antenna 620 of the RFID type adapted to the characteristics of the circuit 605. Again, the antenna 620 is typically a coil linked to the circuit 605 via the two links AC0 and AC1.

In the same way as for the circuit 500, the RFID circuit 605 is here connected to the microcontroller 510 by a bus of the I2C type comprising the links SCL and SDA and the power supply terminal Vcc of the microcontroller 610, like that of the oscillatory circuits 615-1 and 615-2, is connected to the terminal Vout of the RFID circuit 605 delivering a voltage.

However, unlike the circuit 500, the synchronization signal of the microcontroller, used for controlling the triggering or stopping of the oscillation (allowing the mobile element to be located), is here connected to the terminal Vout of the RFID circuit 605 delivering a voltage.

Moreover, the power supply terminal Vcc of the microcontroller 610, like that of the oscillatory circuits 615-1 and 615-2, is connected to the terminal Vout of the RFID circuit 605 delivering a voltage via a diode 625. Moreover, a resistor 630, for example a resistor of one mega ohm (1MΩ) links the terminal Vout of the RFID circuit 605 to the terminal referenced Vss.

Again, the RFID circuit 605 is linked to the RFID antenna 620, which allows it to receive electrical power from the RFID reader and to have a read/write dialogue with the RFID reader in order to update its memory. Moreover, as the output Vout of the RFID circuit 605 is linked to the power supply Vcc of the microcontroller 610 and of the oscillatory circuits 615-1 and 615-2, these three circuits are electrically powered by the RFID circuit 605.

The synchronization of the microcontroller 610 is here carried out by the output Vout of the RFID circuit 605. Thus, when the RFID reader electrically powers the mobile element 600, the output Vout of the RFID circuit 605 supplies a control voltage which is present at the input Sync of the microcontroller 610. This control voltage represents a first logic state. Conversely, when the output Vout changes to high impedance when the RFID reader no longer supplies power to the mobile element 600, the state of the input Sync of the microcontroller 610 changes to 0 Volts thanks to the pulldown resistor 630 and the diode 625 which prevents current returning, representing a second logic state. The first and second logic states allowing the synchronization of the microcontroller 610.

According to this embodiment, the software running on the RFID reader provides for a remote power supply signal to be generated and for this signal to be activated when it is desired to synchronize the microcontrollers of the mobile elements.

Figure 7:
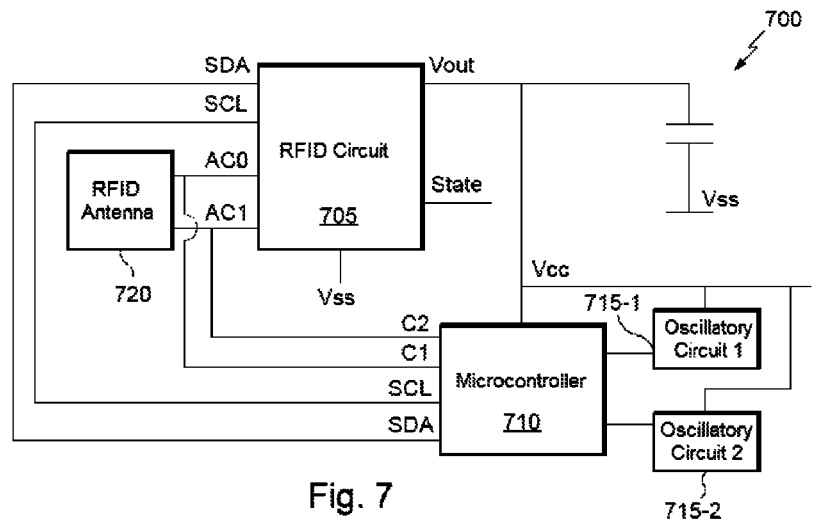

FIG. 7 shows a third embodiment of an electronic circuit 700 of a mobile element. Like the circuit 500, the circuit 700 comprises a standard component 705 offering functions of the RFID type and incorporating a dual-port memory (RFID component), a microcontroller 710 and two oscillatory circuits 715-1 and 715-2, generically referenced 715. The circuit 700 comprises moreover an antenna 720 of the RFID type adapted to the characteristics of the circuit 705. Again, the antenna 720 is typically a coil linked to the circuit 705 via the two links AC0 and AC1.

In the same way as for the circuit 500, the RFID circuit 705 is here connected to the microcontroller 710 by a bus of the I2C type comprising the links SCL and SDA and the power supply terminal Vcc of the microcontroller 710, like that of the oscillatory circuits 715-1 and 715-2, is connected to the terminal Vout of the RFID circuit 705 delivering a voltage.

However, unlike the circuit 500, the synchronization signal of the microcontroller 710 is not used. In fact, the synchronization is carried out here based on the result of an analog comparator of the microcontroller 710, the terminals of which are marked C1 and C2. As shown, these terminals are connected, respectively, to the terminals AC0 and AC1 of the RFID antenna 720. As a result, the control of the triggering or stopping of the oscillation (allowing the mobile element to be located), is here directly linked to the RFID antenna 720.

Again, the RFID circuit 705 is linked to the antenna RFID 720, which allows it to receive electrical power from the RFID reader and to have a read/write dialogue with the RFID reader in order to update its memory. Moreover, as the output Vout of the RFID circuit 705 is linked to the power supply Vcc of the microcontroller 710 and of the oscillatory circuits 715-1 and 715-2, these three circuits are electrically powered by the RFID circuit 705.

The analog comparator of the microcontroller 710, linked to the terminals C1 and C2, is configured in counter mode (capture mode). This makes it possible to obtain a count of the number of oscillations at the output of the RFID antenna 720. Thus, a frequency equal to the frequency of the carrier emitted by the RFID reader can be detected at the output of the analog comparator when the latter emits a carrier, for example a frequency equal to 15 Mhz. If on the other hand, the RFID reader does not emit a carrier, no frequency is detected at the output of the analog comparator (or a frequency different from that of the carrier). In other words, the synchronization of the microcontroller 705 is carried out via the detection or not of the carrier of the RFID reader. Thus the software running on the RFID reader provides for the generation or not of the carrier, for example a carrier having a frequency equal to 15 MHz, in a manner that is synchronous with the frequency of activation of the mobile elements.

It is noted here that in order to stop an RFID carrier almost instantaneously, its oscillatory circuit is cut at the moment when the current passing through it is zero.

Figure 8:
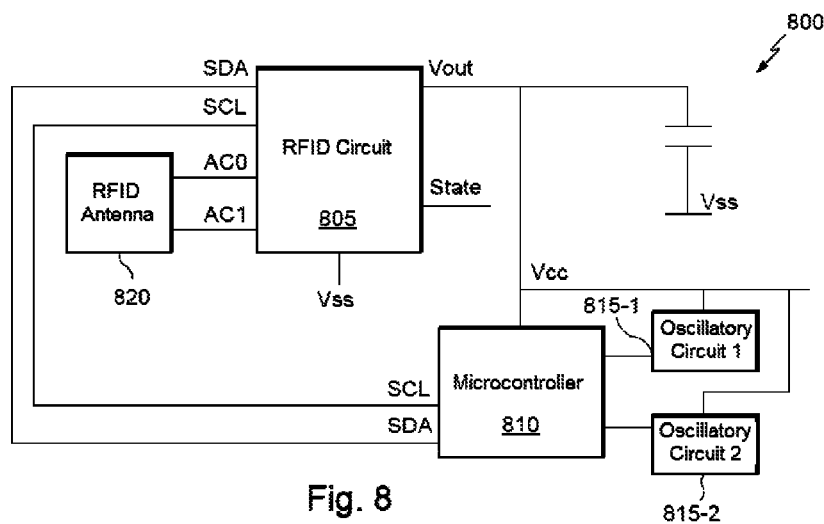

FIG. 8 shows a fourth embodiment of an electronic circuit 800 of a mobile element. Like the circuit 500, the circuit 800 comprises a standard component 805 offering functions of the RFID type and incorporating a dual-port memory (RFID chip), a microcontroller 810 and two oscillatory circuits 815-1 and 815-2, generically referenced 815. The circuit 800 comprises moreover an antenna 820 of the RFID type adapted to the characteristics of the circuit 805. Again, the antenna 820 is typically a coil linked to the circuit 805 via the two links AC0 and AC1.

In the same way as for the circuit 500, the RFID circuit 805 is here connected to the microcontroller 810 by a bus of the I2C type comprising the links SCL and SDA and the power supply terminal Vcc of the microcontroller 810, like that of the oscillatory circuits 815-1 and 815-2, is connected to the terminal Vout of the RFID circuit 805 delivering a voltage.

However, unlike the circuit 500, the synchronization signal of the microcontroller 810 is not used. In fact, the synchronization is carried out here based on the value of an item of data, typically of one bit, stored in the dual-port memory of the RFID circuit 805. As a result, the control of the triggering or stopping of the oscillation (allowing the mobile element to be located), is here directly linked to a value of the RFID circuit 805.

Again, the RFID circuit 805 is linked to the RFID antenna 820, which allows it to receive electrical power from the RFID reader and to have a read/write dialogue with the RFID reader in order to update its memory. Moreover, as the output Vout of the RFID circuit 805 is linked to the power supply Vcc of the microcontroller 810 and of the oscillatory circuits 815-1 and 815-2, these three circuits are electrically powered by the RFID circuit 805.

As indicated previously, the synchronization of the microcontroller 810 is carried out via the reading, here on the I2C bus, of a synchronization bit the change of state of which makes it possible to activate the synchronization. Such a synchronization bit advantageously has a predetermined address.

The software running on the RFID reader provides for the generation of the change of state of the synchronization bit in the memory of the RFID circuit 805.

Each mobile element comprises here at least one solenoid associated with a capacitor, in parallel, to form at least one oscillatory circuit for transmitting a location signal. This oscillatory circuit is here stimulated by a microcontroller fitted into the mobile element.

According to a particular embodiment, the microcontroller situated in the mobile element stimulates an oscillatory circuit by one of its outputs configured to generate a pulse width modulated cyclic signal at a frequency close to the frequency of the oscillatory circuit itself. The control of the cyclic ratio has the effect of modulating the power transmitted by the location module.

It is observed here that the recent microcontrollers have circuits that make it possible to generate pulse width modulated signals. The use of this hardware functionality allows the microcontroller to freely execute software code instructions during the generation of the signal. Thus, the microcontroller can implement other functions and perform calculations without disturbing the timing of the pulse width modulated signal.

FIG. 9 shows an example of an oscillatory circuit for a mobile element, controlled by a microcontroller.

The oscillatory circuit 900 comprises a input terminal 905 linked to a microcontroller to receive from the latter a pulse width modulated signal (signal known as PWM, for Pulse Width Modulation). This terminal is linked, via a resistor R4, for example a 20 kΩ resistor, to the control terminal of a transistor Q1 used in switching mode. The input of the transistor Q1 is linked to an inductive circuit LC comprising an inductor L1 and a capacitor C1 mounted in parallel. The other branch of this inductive circuit is linked to a resistor R1 linked to a voltage source, for example a 3.3V regulated voltage source. The value of the resistor R1 is here equal to 100Ω. The value of the inductor L1 is for example 220 µH while the value of the capacitor C1 is for example 3.2 nF. The output of the transistor Q1 is linked to a resistor R2 which is moreover grounded. The value of the resistor R2 is for example equal to 100Ω. A pull-down resistor R3 the value of which is here equal to 1 MΩgrounds the control terminal of the transistor Q1.

The phases of starting and stopping the oscillations are periods of time when the location signal received by a detection surface cannot generally be used because it is generally not sufficiently powerful and has a non-constant and uncontrolled amplitude. In a use where a large number of mobile elements must transmit in turn, these starting and stopping times become non-negligible with respect to the useful emission time during which the electronics of the detection surface can effectively locate the mobile elements.

As a result, it is important for the phases of starting and stopping to be short. To these ends, on starting, during the first oscillations, the cyclic ratio of the digital signal generated by the microcontroller of the mobile element is modified to inject more power and very quickly, preferably over only one or two cycles, reach the nominal amplitude.

Similarly, during the stopping phase, rather than simply ceasing to stimulate the oscillatory circuit and allowing it to drop back at an exponential rhythm (RLC equivalent circuit), for one or two cycles, the microcontroller injects a pulse in each cycle in phase opposition to the natural oscillation of the circuit.

FIG. 10 shows a simulation demonstrating the active control of the phases of starting and stopping the oscillation of an inductor. Time is represented on the y-axis. The signal in solid lines represents the voltage at the terminals of the inductive circuit LC, the signal in dotted lines represents the voltage-control pulses originating from the microcontroller and the signal in bold dotted lines of variable length represents the power supply current consumed by the oscillatory circuit.

It is observed here that the modulation of the power transmitted by oscillatory circuits of the location modules makes it possible to encoder a bit stream corresponding to data to be transferred to a computerized system linked to the location surface. Knowing the amplitude A1 corresponding to the low state and the amplitude A2 corresponding to the high state of a location signal, it is possible to use a modulation of the NRZ type (for Non Return to Zero) which allows the detection surface to discriminate the variations in amplitude associated with a data transfer, from those due to all the causes which can produce a relatively slow variation of the power received (comprising in particular the variation of the distance between the mobile element and the detection surface as well as the variation of the supply voltage of the mobile element).

It is also observed that when a mobile element acquires energy (function called energy harvesting) on an RFID carrier, the currents induced in the receiving coil of the mobile element produce a negative counter-reaction which locally reduces the power of the magnetic field. In the phases where a mobile element has no need for more energy than that already accumulated, it can, preferably, open the circuit of its receiving coil to suppress in this way the disturbance induced on the local magnetic field. Such a function can in particular be carried out using an analogue switch of the MOSFET type (for Metal Oxide Semiconductor Field Effect Transistor) with low resistance and leakage current.

Moreover, regardless of the hardware solution envisaged for the communications, data transfers to and from the mobile elements can be encrypted according to an encryption system, for example a system based on public and private keys of the RSA type (for Rivest Shamir Adleman) or AES type (for Advanced Encryption Standard).

It is observed here that according to the embodiments described previously, the activation of oscillatory circuits allowing them to be located is carried out by the microcontrollers of the mobile elements, the latter receiving items of synchronization information from a signal of the RFID type received from the mobile element in question. However, these items of information typically derive from a low-frequency signal, for example a signal having a frequency of 1 Hz (such a frequency can be obtained when the synchronization is carried out by breaking the remote power supply carrier, because it is desirable to limit the cutoff frequency).

However, the microcontrollers used must generate pulses in order to trigger each solenoid in a refresh cycle, i.e. a cycle of determining the position and, if applicable, the orientation of each mobile element of a set of mobile elements, compatible with a real time use of the system. Such a refresh frequency is, for example, 60 Hz. At this frequency, each refresh cycle has a duration of 16 ms. Pulses must therefore be supplied by each microcontroller every 16 ms, with a time delay for the start of each impulsion, for each oscillatory circuit, which depends on a timeslot allocated to the latter. Allocation of such a timeslot can be carried out according to the teaching of Patent Application WO 2012/028827.

As each microcontroller receives only an item of low-frequency information, it must have a time basis which is suitable for it to generate the pulses every 16 ms and reset this time basis as soon as the external synchronization signal is available. This makes it possible to avoid too large a drift in the internal clock of the microcontroller.

In the situation where the internal clocks of the mobile elements and of the electronics of the location surface do not have exactly the same timing, the mobile elements compensate their internal clock on the basis of a comparison of the measured duration between two consecutive items of synchronization information with a predetermined theoretical duration. It is observed that the longer this duration, the more accurate the correction. Thus, if the measurement of the duration is carried out with an accuracy P and over a predetermined theoretical duration D, the accuracy of compensation of the microcontroller clock is equal to P/D. By way of illustration, if the accuracy is P=10 µs and the duration is D=1 s, the accuracy obtained is equal to $1e^{-5}$, i.e. potentially one thousand times better that the typical $+/-2e^{-2}$ of an uncalibrated internal clock of a microcontroller.

The location modules can also receive power from radiating rows and columns of a location surface, in particular rows and columns used to receive location signals originating from location modules.

FIG. 11 shows an example of a location module making it possible to receive power from the rows and columns of a location surface, used to receive location signals originating from location modules. As shown, the location module 1100 is here provided with a switch 1105 allowing the radiation of a solenoid 1110 according to a conventional configuration used for it to be located. In this configuration, a microcontroller 1115 generates a signal, for example a periodic signal having a frequency of 200 KHz, as a function of a synchronization command originating from a synchronization module 1120. The signal generated is amplified in an oscillatory circuit 1125 and transmitted to the solenoid 1110.

The switch 1105 also makes it possible to use the solenoid 1110 as receiver of power by inductive coupling, the solenoid 1110 being, for these purposes, linked to an energy harvesting circuit 1130. By way of illustration, such an energy harvesting circuit can comprise rectifier diodes and a capacitor allowing the storage of current that can reused later.

The switch 1105 finally allows one of the two terminals of the solenoid 1110 to be left open so that no current can pass through it. This mode is in particular useful in phases during which a mobile element has no need for more energy than that already accumulated, thus suppressing the disturbance induced on the local magnetic field. This non-captured power then becomes available for the nearby mobile elements.

The synchronization data item is supplied by the synchronization module 1120 which can be, for example, an FM radio receiver, in particular an FM receiver capable of receiving signals having a frequency around 433 MHz. A synchronization data item must be used to indicate to the microcontroller if it must be in location mode, power acquisition mode or "open" mode. This item of information can be transmitted in the form of a bit stream by a microcontroller of the location surface.

It is observed here that the RFID protocol uses an HF carrier (for High Frequency) which if it is emitted continuously can interfere with the process of location of the mobile elements by the location surface. In order to suppress or at least to reduce this effect, the RFID carrier, according to a particular embodiment, is emitted continuously at a frequency of approximately 13.56 MHz. Moreover, the use of one or more low-pass filters at the input of the detection surface makes it possible to reject this frequency while allowing the signal originating from the location modules to pass.

According to another embodiment, the RFID carrier is only emitted during one or more time intervals of each refresh cycle, the location modules of the mobile elements being activated outside these time intervals, without risk of interference.

Moreover, in order to reduce its electricity consumption, a mobile element can place its electronics on standby during the time interval of each refresh cycle (fixed and repetitive), during which it must not activate its location module or transmit data.

According to a particular embodiment, certain mobile elements do not activate their location modules at each refresh cycle, denoted here $T_1$, but according to a multiple, denoted N, of this cycle, i.e. according to a cycle $N \times T_1$. Such an embodiment is in particular adapted to mobile elements intended to be rarely moved on the location surface. This also has the effect of making it possible to reduce the electricity consumption of these mobile elements which can, in a synchronized regime, place their consumer components on standby, including those in charge of the reception of a synchronization signal, during a time interval at least equal to $(N-1) \times T_1$. The electricity consumption reduction factor is then of the order N.

Still according to a particular embodiment, the common synchronization signal can comprise at least two separate signals denoted here SyncA and SyncB, that can be differentiated by the mobile elements. By way of illustration, the signal SyncA is transmitted according to a cycle of N cycles of duration $T_1$ while the signal SyncB is transmitted at each cycle of duration $T_1$. Thus, when a delay value equal to M, with $0 \leq M < N$, is allocated to a mobile element, the latter is activated every N cycles, at a time $M \times T_1$ following the reception of the signal SyncA.

It is observed here that if, in theory, a mobile element only needs the signal SyncA, in practice, the use of the signal SyncB is preferable, when the value of M is non-zero, in order to increase the accuracy of the scheduling of activation of the mobile elements.

Thus, for example, with reference to FIG. 12, concerning the module 3 (activated when M=2) and a timeslot equal to three, the module waits, during initialization, for the reception of the signal SyncA then places itself in standby state during a time less than $2 \times T_1$. At the end of standby, it waits for the signal SyncB then waits for a duration equal to three timeslots to activate an electromagnetic emission (i.e., typically, to excite a solenoid). It then retur4ns to standby until a time preceding the reception of the signal SyncB of the following cycle $N \times T_1$. From that moment, it is, then in theory no longer necessary for the mobile element to wait for the signal SyncA. However, in order to avoid potential problems of desynchronization, the mobile element can advantageously check from time to time, for example once per second, that the reception of the signal SyncA is in fact situated at the expected time in its cycle $N \times T_1$. If a drift is observed, the mobile element preferably repeats the complete synchronization cycle starting from the reception of the signal SyncA.

The synchronization signals are, for example, transmitted by frequency modulation of a radio carrier. By way of illustration, the signals SyncA and SyncB are square wave pulse signals having a different duration.

FIG. 12 shows an example of a synchronization timing chart when two synchronization signals SynA and SyncB are used. The signal SyncA is transmitted according to a cycle of N cycles of duration $T_1$ while the signal SyncB is transmitted at each cycle of duration $T_1$, with $T_1$=25 ms and N=4. Signal SyncA here has square pulses with a duration of one millisecond, while the signal SyncB has square pulses with a duration of one and a half milliseconds.

The timing chart shown relates to the activation of four mobile elements each comprising a location module. These mobile elements here share the same timeslot and have M delay values equal to 0, 1, 2 and 3, respectively.

Still according to a particular embodiment, the location surface as well as each of the mobile elements comprise an electronic system capable of implementing the functionality known as MultiCeiver of the protocol known as Enhanced Shockburst (MultiCeiver and Enhanced Shockburst are trade marks), this functionality making it possible to produce the common synchronization signal.

This functionality can in particular be implemented using an electronic component having the reference nRF24LE1 from Nordic Semiconductor. According to this embodiment, the circuit nRF24LE1 of the location surface transmits the synchronization signals SyncA and SyncB in the following manner:

each of the mobile elements reserves a logic address ALSYNC with a predetermined and identical value for all the mobile elements, this address is here reserved in a communication interface called "data pipe 0";

the circuit nRF24LE1 of the location surface transmits to the address ALSYNC, at each refresh cycle $T_1$, a data packet comprising at least one byte. For the synchronization signal SyncA, the first byte of the data packet has a first predetermined value and, for the synchronization signal SyncB, the first byte of the data packet has a second value, different from the first value used for the synchronization signal SyncA;

on the mobile elements side, the reception of each of these signals produces, with a constant delay, a hardware interrupt which indicates the precise moment of the synchronization. Moreover, by reading the first byte of the data packet received, the software of the circuit nRF24LE1 determines if it is the synchronization signal SyncA or SyncB.

By way of illustration, the location modules can be incorporated into mobile devices such as robots or toys, for example cars or helicopters. The acquisition in real time of the position and orientation of a mobile device as well as the control of actuators of the latter make it possible to direct it automatically, for example in order to make it follow particular routes that can in particular be defined by a software application. To these ends, the application software used and which executes on a calculator, for example a computer of the PC type (for Personal Computer), a smartphone or a tablet, can transmit control commands via an interface of the SDK type (for Software Development Kit). Such control commands are, for example, a direction and a speed of rotation of motors. They are coded and transmitted to the RFID-type reader used which can then transmit them in the form of an RFID-type signal, in a write instruction, to an RFID-type circuit of a location module.

A microcontroller of the latter can then read them from the memory of the RFID-type circuit by using, for example, an I2C bus. These commands or data representative of these commands are, preferably, stored at predetermined sites on the RFID-type circuit. The microcontroller of the location module is here equipped with outputs, for example outputs of the PWM type, making it possible to control actuators such as motors from the items of information stored in the RFID-type circuit.

Naturally, to meet specific needs, a person skilled in art could make changes to the above description. In particular, if the invention is described in particular for the purposes of illustration with reference to the RFID protocol, the invention is not limited to the use of the latter.

The invention claimed is:

1. A device for aiding the location in real time, by electromagnetic radiation, of a self-powered mobile element, this device comprising,
a receiver for receiving a radio signal comprising at least one synchronization data item, said receiver being configured to receive power from a radio signal received;
a transmitter for transmitting an electromagnetic signal, said electromagnetic signal being transmitted in response to an activation signal; and
a controller connected to said receiver and to said transmitter for transmitting an electromagnetic signal, said controller being electrically powered by said receiver for receiving a radio signal and being configured to generate an activation signal in response to a synchronization data item.

2. The device according to claim 1, wherein said receiver for receiving a radio signal comprises a dual-port memory, said dual-port memory being configured to be read- and write-accessible by a radio signal and by said controller.

3. The device according to claim 1, wherein said receiver for receiving a radio signal comprises means for the identification of a synchronization data item from a radio signal received and a transmitter for the transmission of an identified synchronization data item to said controller.

4. The device according to claim 1, wherein said controller comprises a detector for the detection of a change of state of an electrical power source of said receiver for receiving a radio signal, a synchronization data item being identified in response to a change of state of an electrical power source of said receiver for receiving a radio signal.

5. The device according to claim 1, wherein said controller comprises a detector for the detection of a change of state of a carrier of a radio signal received, a synchronization data item being identified in response to a change of state of a carrier of a radio signal received.

6. The device according to claim 2, wherein said controller comprises means of access to a value stored in said dual-port memory, a synchronization data item being identified as a function of a value stored in said dual-port memory.

7. The device according to claim 1, wherein said transmitter for transmitting an electromagnetic signal comprises a solenoid (L1) and a switch (Q1) controlling the activation of said solenoid.

8. The device according to claim 1, further comprising means for determining a moment of generation of an activation signal, said moment being determined according to the moment of reception of a synchronization data item and an item of delay information.

9. The device according to claim 1, wherein said receiver for receiving a radio signal complies with a standard of the RFID type.

10. The device according to claim 1, wherein said controller comprises means for controlling at least one actuator of said mobile element.

11. The device according to claim 1, further comprising a second transmitter for transmitting an electromagnetic signal, said transmitter for transmitting an electromagnetic signal being called the first transmitter for transmitting an electromagnetic signal, said first and second transmitters for transmitting an electromagnetic signal being configured to transmit an electromagnetic signal one after another in order to allow the orientation of said mobile element to be determined.

12. The device according to claim 2, wherein said receiver for receiving a radio signal comprises means for the identification of a synchronization data item from a radio signal received and a transmitter for the transmission of an identified synchronization data item to said controller.

13. The device according to claim 2, wherein said controller comprises a detector for the detection of a change of state of an electrical power source of said receiver for receiving a radio signal, a synchronization data item being identified in response to a change of state of an electrical power source of said receiver for receiving a radio signal.

14. The device according to claim 2, wherein said controller comprises a detector for the detection of a change of state of a carrier of a radio signal received, a synchronization data item being identified in response to a change of state of a carrier of a radio signal received.

15. The device according to claim 2, wherein said transmitter for transmitting an electromagnetic signal comprises a solenoid (L1) and a switch (Q1) controlling the activation of said solenoid.

16. The device according to claim 2, further comprising means for determining a moment of generation of an activation signal, said moment being determined according to the moment of reception of a synchronization data item and an item of delay information.

17. The device according to claim 2, wherein said receiver for receiving a radio signal complies with a standard of the RFID type.

18. The device according to claim 2, wherein said controller comprises means for controlling at least one actuator of said mobile element.

19. The device according to claim 2, further comprising a second transmitter for transmitting an electromagnetic signal, said transmitter for transmitting an electromagnetic signal being called the first transmitter for transmitting an electromagnetic signal, said first and second transmitters for transmitting an electromagnetic signal being configured to transmit an electromagnetic signal one after another in order to allow the orientation of said mobile element to be determined.

* * * * *